United States Patent [19]

Yamada

[11] Patent Number: 5,329,474
[45] Date of Patent: Jul. 12, 1994

[54] ELEMENT REARRANGEMENT METHOD FOR FAST FOURIER TRANSFORM

[75] Inventor: Shouichirou Yamada, Tokyo, Japan
[73] Assignee: NEC Corporation, Tokyo, Japan
[21] Appl. No.: 978,948
[22] Filed: Nov. 23, 1992
[30] Foreign Application Priority Data
  Nov. 22, 1991 [JP] Japan .................................. 3-334220
[51] Int. Cl.$^5$ .............................................. G06F 7/34
[52] U.S. Cl. .................................................... 364/726
[58] Field of Search ............................. 364/726, 725
[56] References Cited

U.S. PATENT DOCUMENTS

| | | | |
|---|---|---|---|
| 4,181,976 | 1/1980 | Collins et al. | 364/726 |
| 4,823,297 | 4/1989 | Evans | 364/726 |
| 4,916,649 | 4/1990 | Yorozu et al. | 364/726 |
| 4,977,533 | 12/1990 | Miyabayashi et al. | 364/726 |

*Primary Examiner*—Long T. Nguyen
*Attorney, Agent, or Firm*—Foley & Lardner

[57] ABSTRACT

In a Fast Fourier Transform method, the elements of Fast Fourier Transform are arranged as a two-dimensional square and stored in areas of an array whose number of lines is twice that of columns. Positions of the columns having bit reversed column numbers are exchanged and the elements are linear vector stored so that the initial element of a column is always one position lower than the previous one. Then, the elements of such linear vector stored array are rearranged through exchange of columns having elements with bit reversed numbers and movement of the columns fully upward to made them flush.

5 Claims, 9 Drawing Sheets

FIG. 2A

ORIGINAL ARRAY D1

| 0 | 4 | 8 | 12 |
|---|---|---|----|
| 1 | 5 | 9 | 13 |
| 2 | 6 | 10 | 14 |
| 3 | 7 | 11 | 15 |

FIG. 2C

ARRAY AFTER REARRANGEMENT OF ELEMENTS WITH BIT REVERSED NUMBERS D3

| 0 | 2 | 1 | 3 |
|---|---|---|---|
| 8 | 10 | 9 | 11 |
| 4 | 6 | 5 | 7 |
| 12 | 14 | 13 | 15 |

COLUMNS HAVING BIT REVERSED NUMBERS ARE EXCHANGED AND FULLY MOVED UPWARD

FIG. 2B

COLUMNS HAVING BIT REVERSED NUMBERS ARE EXCHANGED AND SYMMETRICALLY REARRANGED WITH RESPECT TO OBLIQUE AXIS

| 0 |   |   |   |
|---|---|---|---|
| 8 | 1 |   |   |
| 4 | 9 | 2 |   |
| 12 | 5 | 10 | 3 |
|   | 13 | 6 | 11 |
|   |   | 14 | 7 |
|   |   |   | 15 |

SYMMETRICALLY REARRANGED ARRAY D2

FIG. 5
PRIOR ART

| I | I-1 | NORMAL BINARY EXPRESSION | REVERSE BINARY EXPRESSION | IND (I) |
|---|---|---|---|---|
| 1 | 0 | 0 0 0 0 0 | 0 0 0 0 0 | 1 |
| 2 | 1 | 0 0 0 0 1 | 1 0 0 0 0 | 17 |
| 3 | 2 | 0 0 0 1 0 | 0 1 0 0 0 | 9 |
| 4 | 3 | 0 0 0 1 1 | 1 1 0 0 0 | 25 |
| 5 | 4 | 0 0 1 0 0 | 0 0 1 0 0 | 5 |
| 6 | 5 | 0 0 1 0 1 | 1 0 1 0 0 | 21 |
| 7 | 6 | 0 0 1 1 0 | 0 1 1 0 0 | 13 |
| 8 | 7 | 0 0 1 1 1 | 1 1 1 0 0 | 29 |
| 9 | 8 | 0 1 0 0 0 | 0 0 0 1 0 | 3 |
| 10 | 9 | 0 1 0 0 1 | 1 0 0 1 0 | 19 |
| 11 | 10 | 0 1 0 1 0 | 0 1 0 1 0 | 11 |
| 12 | 11 | 0 1 0 1 1 | 1 1 0 1 0 | 27 |
| 13 | 12 | 0 1 1 0 0 | 0 0 1 1 0 | 7 |
| 14 | 13 | 0 1 1 0 1 | 1 0 1 1 0 | 23 |
| 15 | 14 | 0 1 1 1 0 | 0 1 1 1 0 | 15 |
| 16 | 15 | 0 1 1 1 1 | 1 1 1 1 0 | 31 |
| 17 | 16 | 1 0 0 0 0 | 0 0 0 0 1 | 2 |
| 18 | 17 | 1 0 0 0 1 | 1 0 0 0 1 | 18 |
| 19 | 18 | 1 0 0 1 0 | 0 1 0 0 1 | 10 |
| 20 | 19 | 1 0 0 1 1 | 1 1 0 0 1 | 26 |
| 21 | 20 | 1 0 1 0 0 | 0 0 1 0 1 | 6 |
| 22 | 21 | 1 0 1 0 1 | 1 0 1 0 1 | 22 |
| 23 | 22 | 1 0 1 1 0 | 0 1 1 0 1 | 14 |
| 24 | 23 | 1 0 1 1 1 | 1 1 1 0 1 | 30 |
| 25 | 24 | 1 1 0 0 0 | 0 0 0 1 1 | 4 |
| 26 | 25 | 1 1 0 0 1 | 1 0 0 1 1 | 20 |
| 27 | 26 | 1 1 0 1 0 | 0 1 0 1 1 | 12 |
| 28 | 27 | 1 1 0 1 1 | 1 1 0 1 1 | 28 |
| 29 | 28 | 1 1 1 0 0 | 0 0 1 1 1 | 8 |
| 30 | 29 | 1 1 1 0 1 | 1 0 1 1 1 | 24 |
| 31 | 30 | 1 1 1 1 0 | 0 1 1 1 1 | 16 |
| 32 | 31 | 1 1 1 1 1 | 1 1 1 1 1 | 32 |

FIG. 8
PRIOR ART

| I | IND(I) | BANK NUMBER | 1 | 2 | 3 | 4 |
|---|---|---|---|---|---|---|
| 1 | 1 | 1 | ○ | | | |
| 2 | 17 | 1 | ○ | | | |
| 3 | 9 | 1 | ○ | | | |
| 4 | 25 | 1 | ○ | | | |
| 5 | 5 | 1 | ○ | | | |
| 6 | 21 | 1 | ○ | | | |
| 7 | 13 | 1 | ○ | | | |
| 8 | 29 | 1 | ○ | | | |
| 9 | 3 | 3 | | | ○ | |
| 10 | 19 | 3 | | | ○ | |
| 11 | 11 | 3 | | | ○ | |
| 12 | 27 | 3 | | | ○ | |
| 13 | 7 | 3 | | | ○ | |
| 14 | 23 | 3 | | | ○ | |
| 15 | 15 | 3 | | | ○ | |
| 16 | 31 | 3 | | | ○ | |
| 17 | 2 | 2 | | ○ | | |
| 18 | 18 | 2 | | ○ | | |
| 19 | 10 | 2 | | ○ | | |
| 20 | 26 | 2 | | ○ | | |
| 21 | 6 | 2 | | ○ | | |
| 22 | 22 | 2 | | ○ | | |
| 23 | 14 | 2 | | ○ | | |
| 24 | 30 | 2 | | ○ | | |
| 25 | 4 | 4 | | | | ○ |
| 26 | 20 | 4 | | | | ○ |
| 27 | 12 | 4 | | | | ○ |
| 28 | 28 | 4 | | | | ○ |
| 29 | 8 | 4 | | | | ○ |
| 30 | 24 | 4 | | | | ○ |
| 31 | 16 | 4 | | | | ○ |
| 32 | 32 | 4 | | | | ○ |

PRIOR ART
FIG. 9A

ORIGINAL ARRAY

| 0 | 4 | 8 | 12 |
|---|---|---|---|
| 1 | 5 | 9 | 13 |
| 2 | 6 | 10 | 14 |
| 3 | 7 | 11 | 15 |

→ REARRANGEMENT USING NONLINEAR LOADING / STORING

PRIOR ART
FIG. 9B

ARRAY AFTER REARRANGEMENT OF ELEMENTS WITH BIT REVERSED NUMBERS

| 0 | 2 | 1 | 3 |
|---|---|---|---|
| 8 | 10 | 9 | 11 |
| 4 | 6 | 5 | 7 |
| 12 | 14 | 13 | 15 |

ELEMENT REARRANGEMENT METHOD FOR FAST FOURIER TRANSFORM

BACKGROUNDS OF THE INVENTION

1. Field of the Invention

The present invention relates to a method for Fast Fourier Transform on a computer system provided with a vector functional unit, and particularly relates to a Fast Fourier Transform method characterized by its rearrangement process where elements with certain element numbers and other elements with numbers obtainable by reversing the bits of the above element numbers exchange their positions.

2. Description of the Prior Art

FIG. 4A is a diagram to show the procedure and data flow for execution of ISOGEOMETRIC type fast Fourier transform. FIG. 4B is a diagram to illustrate the expression method used in FIG. 4A.

The letter n is the number of data. Referring to the figure, the circles on the ends of each stage indicate the data and its order (position order) on the memory, the left end circles represent the input data and the right end circles indicate the output data.

In the first stage, the vector V1 consisting of the data at Positions 1 to 4 and the vector V2 consisting of the data at Positions 5 to 8 are subjected to vector addition V1+V2, and the results are stored at Positions 1 to 7 with intervals of one position (shown with solid line in the figure). Vector subtraction V1-V2 is also calculated, and the results are, after they have been multiplied by the rotation factor, stored at Positions 2 to 8 (with intervals of one position). In stages 2 and 3, similar processing is performed for vectors V1 and V2, with the rotation factor updated for each stage.

In ISOGEOMETRIC type Fast Fourier Transform shown in FIG. 4A, data needs to be converted at the last or first stage of the processing as shown in FORTRAN statement of (1) below(Reverse binary expression). In other words, elements of Fast Fourier Transform are required to have their positions exchanged with those occupied by the elements having bit reversed element numbers.

$$DO\ 10\ I=1,N$$
$$10\ A(I)=B(IND(I)) \qquad (1)$$

where N is the size of the data to be rearranged, an array B is the data to be rearranged (input), and an array A is the rearranged data (output). The array IND is the data to define the rearrangement. The array IND(I) has values obtained by expressing (I−1) in binary notation, reversing their bits and then adding 1. This is called "Reverse binary expression". FIG. 5 shows a case where N=32.

It is proposed to execute data rearrangement as described above using a vector functional unit. FIG. 6 is a block diagram to show the configuration outline of a vector functional unit. In the figure, the reference numeral 10 indicates a main memory, 2-1 to 2-4 indicate memory access controllers, 30 is a vector register and 40 is an operation pipeline. An actual main memory 10 has, for example, 512 banks, but the main memory 10 in the figure is provided with four banks only for easier understanding. The memory access controller 2-i (i may be 1, 2, 3 or 4) reads data out of the bank i and writes data to the bank i. The vector register 30 has a plurality of element storing areas.

FIG. 7 is a diagram to illustrate the processing for reverse binary expression of the formula (1) using a vector operation device. The array B existing on the main memory 10 is read out according to IND (I), and loaded to the vector register 30 in order. The first element of the array B is written to the first element storing area, and the 17th element of the array B is stored to the second element storing area of the vector register 30. Thereafter, other elements are also stored according to FIG. 5. After loading the array B to the vector register 30, the vector data in the vector register 30 are stored to the area assigned to the array A in the main memory 10. The I-th element of the vector register 30 is written to the I-th element storing area of the array A.

In a conventional rearrangement for reverse binary expression as above, there occurs severe competitions of banks (bank conflicts) during the loading of input data from the main memory 10 to the vector register 30.

Consider a vector functional unit with four banks. It will have memory bank conflicts as shown in FIG. 8 when N=32. In FIG. 8, an element data has a width of 8 bytes, and a bank has a width of 8 bytes. Other circles mean that the applicable bank is hit. In the example of FIG. 8, each bank is hit for eight times. Frequency of memory bank conflicts is in proportion to the increase in the number of data N, and in inverse proportion to the increase in the number of banks. The frequency of memory bank conflicts IB is expressed by the formula below.

$$IB = N/(IC \times BANK)$$

where N is the vector length which can be expressed as $2^n$, BANK is the number of banks in the memory, and IC is the value obtained by dividing the bank width by the element data width. Such memory bank conflicts result in deteriorated performance of the ISOGEOMETRIC type Fast Fourier Transform. This is why the ISOGEOMETRIC type Fast Fourier Transform is said to be an algorithm not suitable for a vector functional unit.

FIGS. 9A and 9B illustrate a Fast Fourier Transform example where 16 elements 0 to 15 are rearranged through exchanging the positions of the elements having bit reversed element numbers. FIG. 9A shows an original array and FIG. 9B shows an array after element rearrangement. Elements are rearranged by non-linear vector loading/storing.

Specifically, in order to rearrange the elements 0 to 15 whose element numbers are 0 to 15 in FIG. 9A through exchanging the positions of the elements having bit reversed element numbers, the bit reversed numbers 0000, 1000, 0100, ... 0111, 1111 corresponding to the element numbers 0000, 0001, 0010, .... 1110–1111 are stored in an array, which is used in non-linear vector loading and linear staring for a new array as shown in FIG. 9B.

As shown in FIG. 9B, vectoring is used in the rearrangement of the elements having bit reversed element numbers through non-linear vector loading and linear storing.

Some computer systems are provided with exclusive instructions for determination of bit reversed element numbers.

Thus, processing for reverse binary expression of the elements in Fast Fourier Transform tends to cause, due to bank conflicts, a deteriorated performance of the entire Fast Fourier Transform. Besides, element rearrangement using non-linear vector loading and linear storing can be made only at a low speed and is susceptible to bank conflicts, which impairs the processing efficiency of Fast Fourier Transform. In addition, in the case of a system provided with exclusive instructions for determination of bit reversed element numbers, the hardware costs much.

SUMMARY OF THE INVENTION

An object of the present invention is to provide an element rearrangement method for Fast Fourier Transform which eliminates the above drawbacks and enables fast element rearrangement through ordinary linear vector loading/storing.

Another object of the present invention is to provide an element rearrangement method for Fast Fourier Transform which does not degrade the efficiency of Fast Fourier Transform because of no bank conflict and enables low cost hardware because of no need of special instructions for determination of bit reversed numbers.

According to a preferred embodiment of the present invention to attain the above objects, an element rearrangement method for Fast Fourier Transform comprises an array generation step where the elements of Fast Fourier Transform constituting an original array are rearranged through exchange of columns having elements with bit reversed numbers and symmetrical positioning of the columns with respect to the oblique axis and another array generation step where the elements of the array generated in the above step are rearranged through exchange of columns having elements with bit reversed numbers.

According to another preferred embodiment, the exchanges of columns are made by linear vector loading and linear vector storing. Besides, the elements are arranged as a two-dimensional square and the rearrangement is made using the areas of an array whose number of lines is twice the number of columns.

According to still another preferred embodiment, an element rearrangement method for Fast Fourier Transform comprises a step where the elements of Fast Fourier Transform arranged as a two-dimensional square are stored in the areas of an array whose number of lines is twice the number of columns, columns in the array having bit reversed column numbers are exchanged and the elements are linear vector stored to the array areas so that the initial element of a column is always one position lower than the previous one, as well as a step where the linear vector stored array is rearranged through exchange of columns having elements with bit reversed column numbers and the initial elements of the columns are made flush.

Other objects, characteristics and effects of the present invention will be clarified in the detailed description below.

BRIEF DESCRIPTION OF THE DRAWINGS

FIGS. 2A-C are series of explanatory diagrams to illustrate the rearrangement processing where 16 elements of Fast Fourier Transform are rearranged through exchanging their positions among those having bit reversed element numbers;

FIG. 5 is a diagram to illustrate reverse binary expression of an original array to obtain a new array;

FIG. 8 is a diagram to show an example of bank conflicts; and

FIGS. 9A and 9B are diagrams to show conventional processing where 16 elements of Fast Fourier Transform are rearranged through exchange of the positions among those having bit reversed element numbers.

DESCRIPTION OF THE PREFERRED EMBODIMENT

Figure 1:
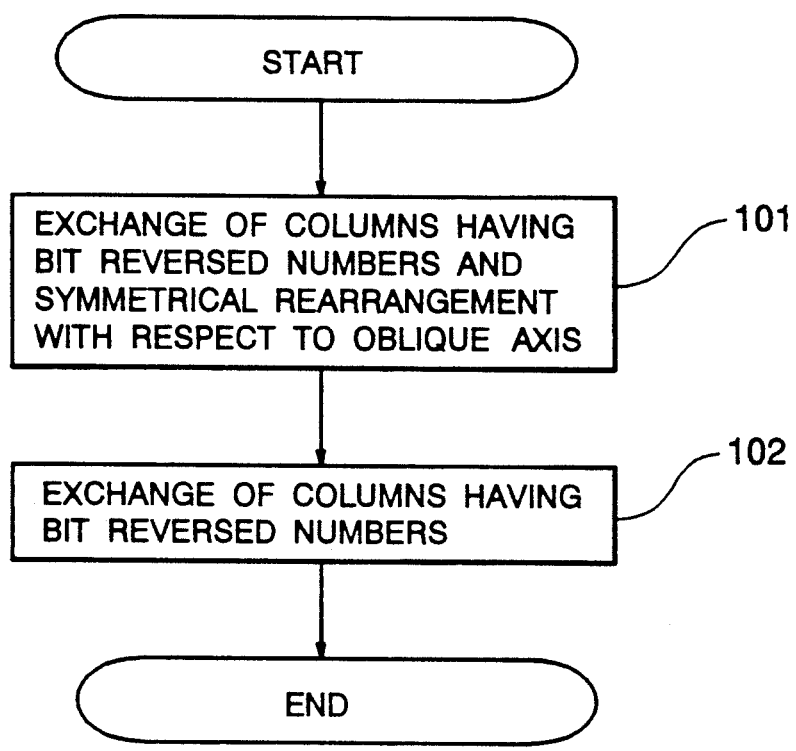
FIG. 1 is a diagram to show the algorithm of element rearrangement method for Fast Fourier Transform according to the present invention.

Referring to the attached figures, preferred embodiments of an information processing device according to the present invention will be described. FIG. 1 shows an algorithm which serves to the Fourier transform elements by exchanging the positions of the elements having bit reversed element numbers by a Fast Fourier Transform according to the present invention. In the Fast Fourier Transform method of the present invention, an array whose number of lines is twice the number of columns is used as the original array for input data. Specifically, the columns having bit reversed numbers are exchanged and symmetrically rearranged with respect to the oblique axis (Step 101), and the columns having bit reversed numbers are further exchanged(-Step 102).

Figure 3A:
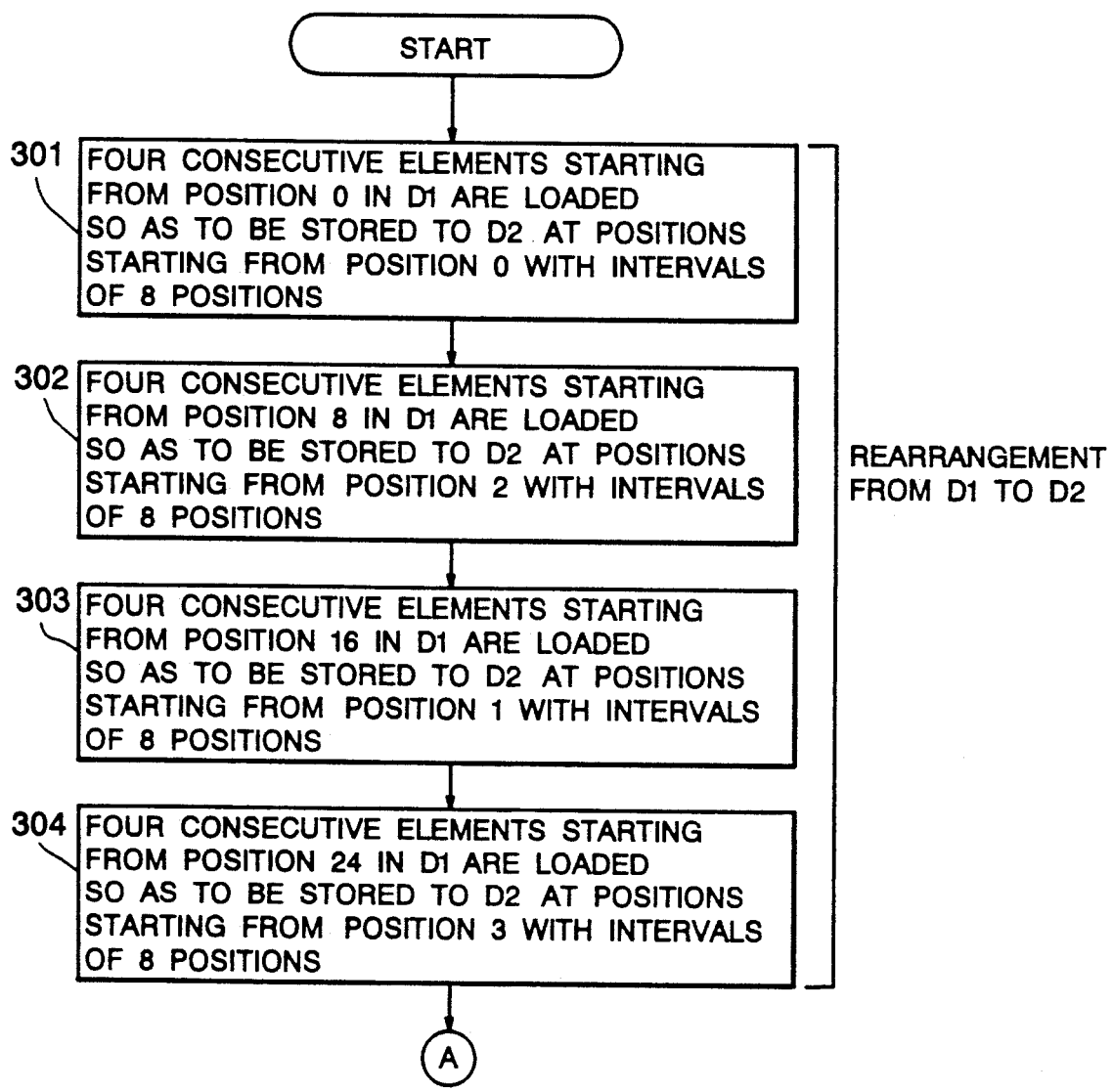
FIGS. 3A mad 3B are flowcharts to illustrate the processing of FIGS. 2A-C.
Figure 3B:
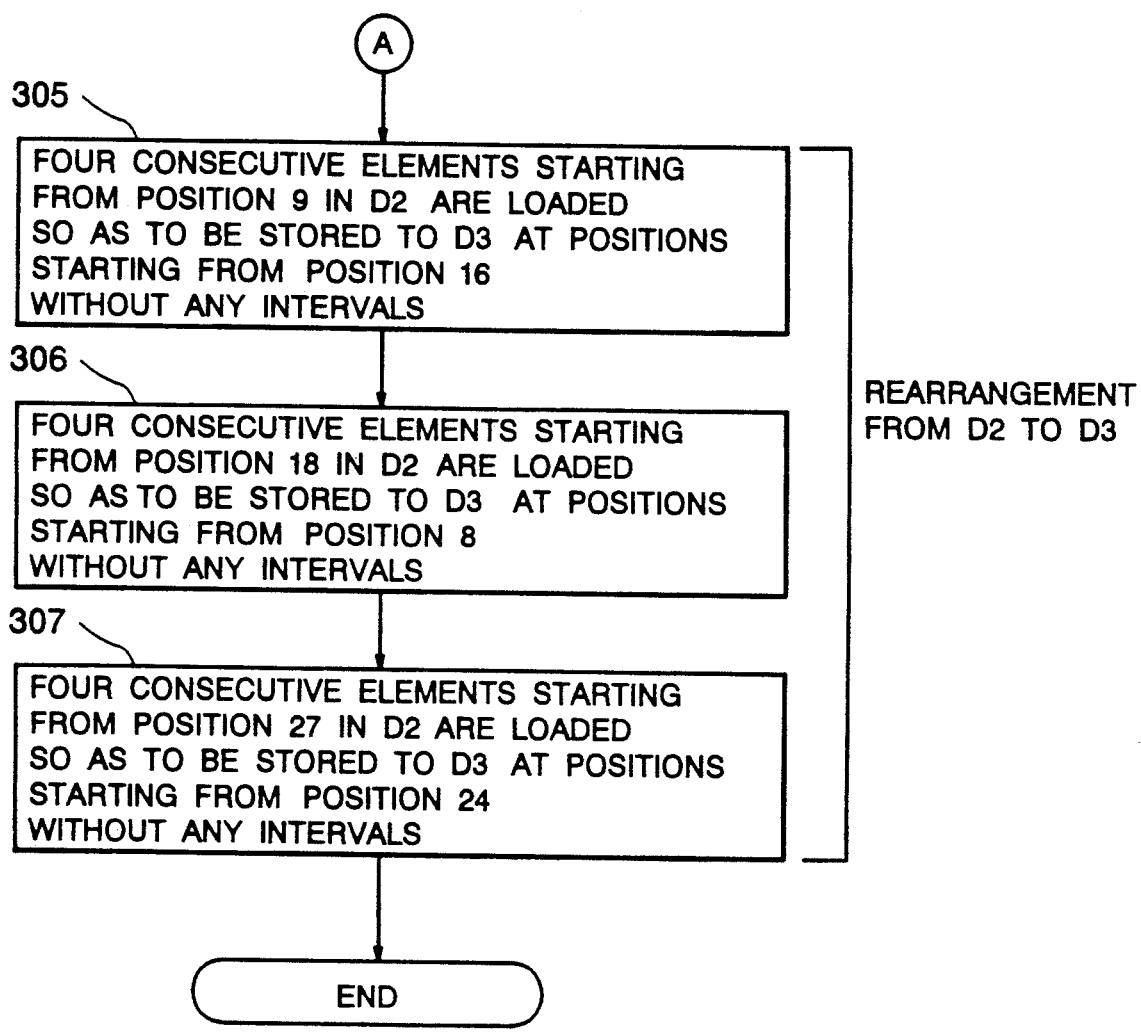
Figure 4A:
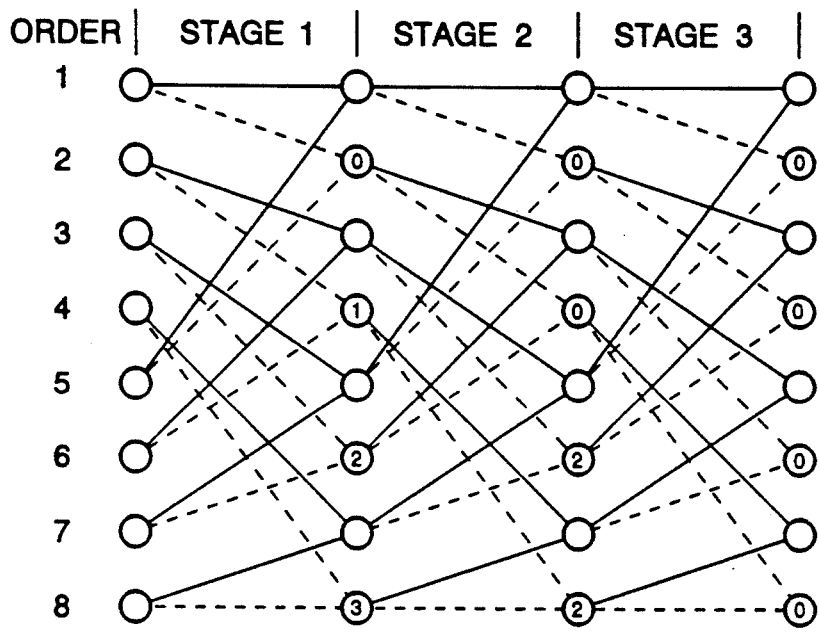
FIGS. 4A and 4B are diagrams to show the processing contents of a conventional Fast Fourier Transform method.
Figure 4B:
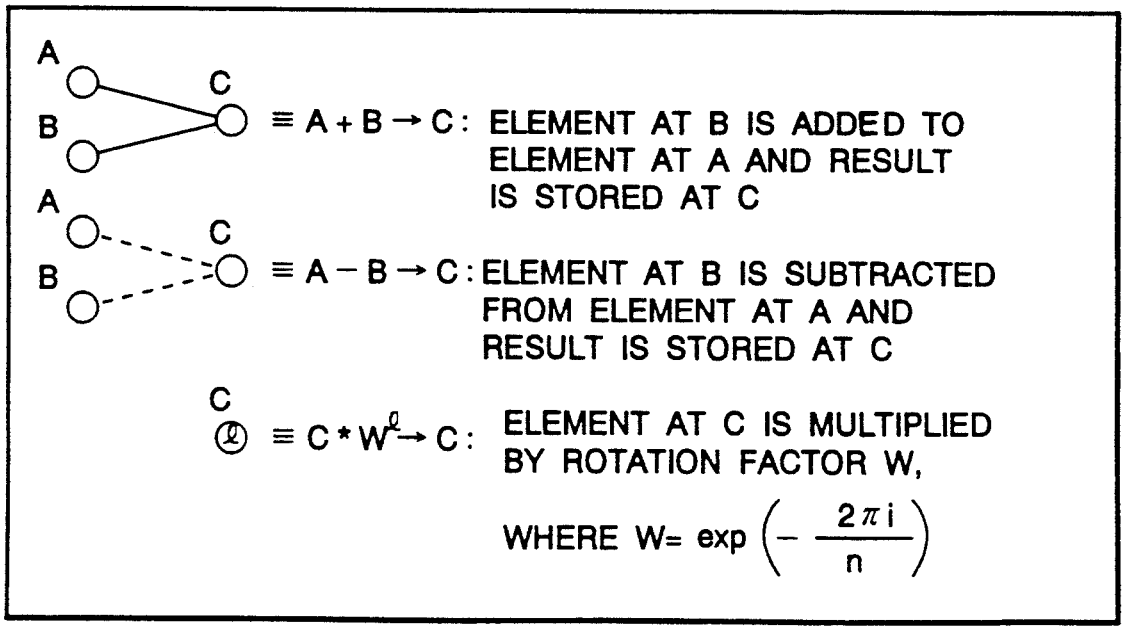
Figure 6:
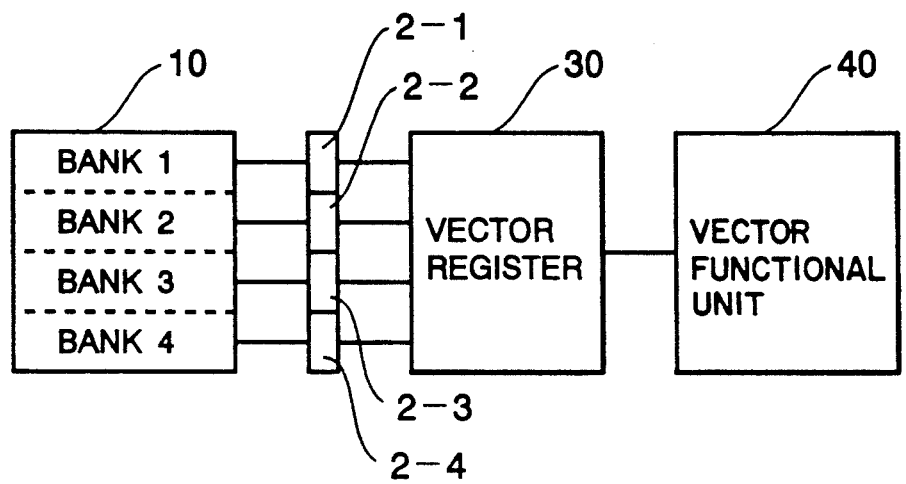
FIG. 6 is a diagram to illustrate the concept of a vector functional unit.
Figure 7:
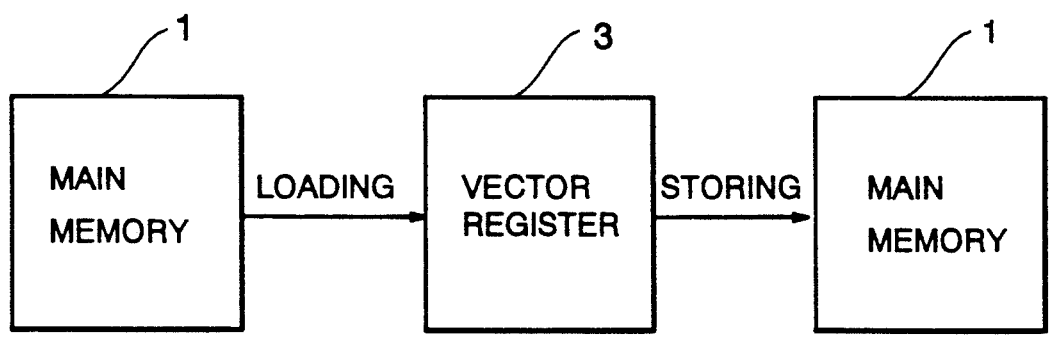
FIG. 7 is a diagram to illustrate the processing where a vector functional unit is used for reverse binary expression.

FIGS. 2A-C are series of explanatory diagrams to show the rearrangement using a vector functional unit of 16 Fast Fourier Transform elements (0) to (15) having the element numbers 0 to 15 through exchange their positions with the elements having the element numbers obtainable by bit reversing of the above element numbers according to the algorithm of FIG. 1. FIGS. 3A and 3B are flowcharts to show such element rearrangement processing of Fast Fourier Transform in FIGS. 2A-C.

First of all, the elements of Fast Fourier Transform (0) to (15) are considered as a two-dimensional array having 4 columns and 8 lines as shown in D1 of FIG. 2A. This array is stored in a Main Memory. Then, the processing, as shown in FIGS. 3A and 3B, is executed through linear vector loading and linear vector storing at the vector functional unit.

FIG. 2A shows the original array D1, FIG. 2B shows an array D2 where the elements are symmetrically arranged and FIG. 2C shows an array D3 where the elements have their positions exchanged with those having bit reversed element numbers.

To obtain the array of FIG. 2B from the array of FIG. 2A, the elements are rearranged through exchanging the columns of elements having bit reversed column numbers, so that they become symmetrical with respect to the oblique axis.

Referring now to FIGS. 3A and 3B for detailed description, in the first step, four consecutive elements at the positions starting from Position 0 in the array D1 (elements (0), (1), (2) and (3)) are loaded and then stored in array D2 at positions starting from Position 0 with intervals of eight positions (Step 301). Secondly, four consecutive elements at the positions from Position 8 in the array D1 (elements (4), (5), (6) and (7)) are loaded and then stored in array D2 at the positions starting from Position 2 with intervals of eight positions (Step 302). Thirdly, four consecutive elements from the 16th element in the array D1 (elements (8), (9), (10), (11)) are loaded and then stored in array D2 at positions starting from Position 1 with intervals of eight positions (Step 303). Fourthly, four consecutive elements from the 24th element of the array D1 (elements (12), (13), (14), (15)) are loaded and then stored in array D2 at positions starting from Position 3 with intervals of eight positions (Step 304). Thus, transformation from the array D1 of FIG. 2A to the array D2 of FIG. 2B is completed. Steps 301 to 304 can be executed in a single operation of linear vector loading/storing by each element.

Transformation from the array D2 of FIG. 2B to the array D3 of FIG. 2C is executed by moving the elements upward so as to eliminate empty positions by exchanging the positions of columns having elements with bit reversed numbers at the same time.

Referring again to FIGS. 3A and 3B for detailed description, four consecutive elements from Position 9 of the array D2 (elements (1), (9), (5) and (13)) are loaded and then stored in array D3 at positions starting from Position 16 without any interval(Step 305). Secondly, four consecutive elements from Position 18 of the array D2 (elements (2), (10), (6) and (14)) are loaded and then stored in array D3 at positions starting from Position 8 without any interval (Step 306). Thirdly, four consecutive elements from Position 27 of array D2 (elements (3), (11), (7), (15)) are loaded and then stored in array D3 at positions starting from Position 24 without any interval (Step 307). Steps 305 to 307 can be executed in a single operation of linear vector loading/storing by each element. Thus, transformation from the array D2 of FIG. 2B to the array D3 of FIG. 2C is completed. In other words, array D3 is generated by exchanging the columns consisting of the elements having bit reversed numbers and moving the elements upward.

The array D3 has an arrangement where the elements in the original array D1 are rearranged by exchanging the positions of the elements having bit reversed element numbers. Thus, the elements (0) to (15) of Fast Fourier Transform are rearranged through exchange of those having bit reversed element numbers.

Exchange of columns having the elements with bit reversed numbers in the original array D1 and symmetric positioning of the elements with respect to the oblique axis (Steps 301 to 304) can be executed in operation of linear vector loading/storing by using a two-dimensional square areas. In such a case, however, linear vector storing with intervals of three will cause frequent bank conflict.

For this reason, the Fast Fourier Transform method according to the present invention adopts a rectangular array whose number of lines is twice the number of columns as shown in the example of FIGS. 2A–C. Linear vector storing is performed so that the initial element of a column is placed one element lower than the previous one (through linear vector storing with intervals of even number positions) in order to prevent bank conflicts. The columns are made flush in the next process where the columns with bit reversed numbers are exchanged. This realizes fast rearrangement in two processes of linear vector loading/storing.

Thus, the present invention requires only two processes of linear vector loading/storing (Steps 301 to 304 and Steps 305 to 307) and is free from bank conflict to realize fast rearrangement. Besides, since there is no need of any special instruction, the hardware is available at a reasonable cost.

Obviously, various modifications can be made to the above embodiment according to the present invention. For example, there are 16 elements of Fast Fourier Transform in FIG. 2A–C, but the number of elements can be more or less than 16. It is intended to cover in the appended claims all such modifications and variations as fall within the true spirit and scope of the invention.

What is claimed is:

1. An element rearrangement method for a Fast Fourier Transform, comprising the steps of:
    (a) rearranging a plurality of elements of Fast Fourier transform constituting an original array by exchanging columns having the elements with bit reversed numbers and symmetrical positioning of the columns with respect to an oblique axis; and
    (b) rearranging the elements of the array generated in the above step by exchanging columns having the elements with bit reversed numbers.

2. A method for Fast Fourier Transform of claim 1 wherein said exchanges of columns are made by a linear vector loading process and linear vector storing process.

3. A method for Fast Fourier Transform of claim 1 wherein the elements are arranged as a two-dimensional square and said rearrangement is made using the areas of an array whose number of lines is twice the number of columns.

4. An element rearrangement method for a Fast Fourier Transform, comprising the steps of:
    (a) storing a plurality of elements of Fast Fourier Transform arranged as a two-dimensional square in the areas of an array whose number of lines is twice the number of columns, the columns in said array having bit reversed column numbers exchanged and the elements being linear vector stored to said array areas so that the initial element of a column is always one position lower than the previous one; and
    (b) rearranging said linear vector stored array by exchanging columns having elements with bit reversed column numbers and the initial elements of the columns being flush.

5. A method for Fast Fourier Transform according to claim 1, wherein said step (a) further includes the steps of:
    a) loading first elements at positions starting from a Position 0 in a first array;
    b) storing said first elements in a second array at positions starting from said Position 0 with intervals of eight positions;
    c) loading second elements at the positions starting from a Position 8 in the first array;
    d) storing said second elements in the second array at positions starting from a Position 2 with intervals of eight positions;
    e) loading third elements at the positions starting from a Position 16 in the first array;
    f) storing said third elements in the second array at positions starting from a Position 1 with intervals of eight positions;
    g) loading fourth elements at the positions starting from a Position 24 in the first array; and h) storing said fourth elements in the second array at positions starting from a Position 3 with intervals of eight positions, and wherein said step (b) further includes the steps of:

i) loading fifth elements at the positions starting from a Position 9 of the second array;

j) storing said fifth elements in a third array at positions starting from a Position 16;

k) loading sixth elements at the positions starting from a Position 18 of the second array;

l) storing said sixth elements in the third array at positions starting from a Position 8;

m) loading seventh elements at the positions starting from a Position 27 of the second array; and n) storing said seventh elements in the third array at positions starting from a Position 24.

* * * * *